(12) United States Patent
Ikedo et al.

(10) Patent No.: US 6,404,718 B1
(45) Date of Patent: Jun. 11, 2002

(54) DISC PLAYER

(75) Inventors: Yuji Ikedo; Yusuke Akama; Ken Okamura; Takashi Nakai; Yoshitake Shimada, all of Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/393,205

(22) Filed: Sep. 9, 1999

(30) Foreign Application Priority Data

Sep. 24, 1998 (JP) .......................................... 10-269555

(51) Int. Cl.$^7$ ............................................... G11B 33/02
(52) U.S. Cl. ..................................................... 369/75.2
(58) Field of Search ............................. 369/24, 30, 36, 369/37, 191, 192, 75.1, 75.2, 77.1, 77.2; 360/92

(56) References Cited

U.S. PATENT DOCUMENTS

| | | | | |
|---|---|---|---|---|
| 4,348,860 A | * | 9/1982 | Hartmannsgruber | 57/100 |
| 4,669,322 A | * | 6/1987 | Messinger et al. | 74/42 |
| 5,065,512 A | * | 11/1991 | Stahlecker | 29/898.09 |
| 5,197,056 A | * | 3/1993 | Van Heusden et al. | 369/37 |
| 5,197,057 A | * | 3/1993 | Iyama et al. | 369/37 |
| 5,204,850 A | * | 4/1993 | Obata | 369/75.2 |
| 5,291,465 A | * | 3/1994 | Dennis | 369/37 |
| 5,768,248 A | * | 6/1998 | Lee | 369/219 |
| 5,867,459 A | * | 2/1999 | Versleegers | 369/37 |
| 5,872,752 A | * | 2/1999 | Inatani | 369/37 |
| 5,927,682 A | * | 7/1999 | Gul et al. | 251/77 |
| 5,995,478 A | * | 11/1999 | Park | 369/219 |
| 6,044,057 A | * | 3/2000 | Park et al. | 369/219 |
| 6,064,636 A | * | 5/2000 | Leung | 369/37 |
| 6,144,523 A | * | 11/2000 | Murthy | 360/99.08 |
| 6,151,279 A | * | 11/2000 | Ikedo et al. | 369/37 |
| 6,192,023 B1 | * | 2/2001 | Seo | 369/219 |

\* cited by examiner

Primary Examiner—Robert S. Tupper
Assistant Examiner—Julie Anne Watko
(74) Attorney, Agent, or Firm—Pitney, Hardin, Kipp & Szuch LLP

(57) ABSTRACT

A disc player is provided with: a turn table (13) for rotating an information record disc, which is placed on the turn table; a clamper (15) for holding the information record disc between the clamper and the turn table; a chassis (10) on which at least one of the clamper and the turn table is mounted and which has a rotation shaft (11a, 11b) parallel to a main surface of the information record disc held between the clamper and the turn table; a driving device (8a, 12) for transmitting a driving force to the chassis so as to rotate the chassis with the rotation shaft at a rotation axis; and an optical pickup (20) for at least reading a signal from the information record disc held between the clamper and the turn table while the disc is rotated on the turn table. A gap (W) is prepared between the rotation shaft and a bearing (22b) for the rotation shaft in a direction parallel to the main surface such that the rotation shaft has a play in the direction parallel to the main surface.

8 Claims, 5 Drawing Sheets

DISC PLAYER

BACKGROUND OF THE INVENTION

1. Field of the Invention

The present invention relates to a disc player, which clamps a disc by rotating a chassis on which a clamper or a turn table is mounted.

2. Description of the Related Art

There is a disc player, which pinches and holds a disc between a clamper and a turn table mounted on a rotatable chassis. The chassis is provided with a central shaft which is parallel to a main surface of the disc. This rotation shaft is held rotatably by a bearing provided on a tray or the like. By rotating the chassis with respect to the tray around the rotation shaft as a center by means of an elastic member, a cam etc., so as to swing the turn table, the disc is pinched and held between the turn table and the clamper which is located above the turn table.

On the other side of the chassis, a guide member is formed. The guide member is engaged with a guide rail extending in a direction perpendicular to the main surface of the disc, so as to guide the rotational movement of the chassis. By virtue of the guide member, it is possible to improve the positional accuracy of the chassis and the turn table in the direction of the main surface of the disc. Thus, it is possible to prevent a miss-clamp when claming the disc.

However, in case of the above-mentioned disc player, the position of the chassis in the direction of the main surface of the disc is restricted by the rotation shaft, while the position of the chassis in the direction of the main surface of the disc is further restricted by the guide member. Namely, the movement of the chassis is restricted redundantly by the rotation shaft and the guide member. Thus, by a subtle deformation of the constitutional element such as the chassis or the guide member, a stiffness is generated between the rotation shaft and the bearing or between the guide rail and the guide member, resulting in that the rotational movement of the chassis cannot be smoothly performed.

SUMMARY OF THE INVENTION

It is therefore an object of the present invention to provide a disc player, in which a stiffness is not generated in the rotational movement of the chassis on which the turn table or the clamper is mounted, and which can smoothly rotate the chassis, when clamping the disc.

The above object of the present invention can be achieved by a disc player provided with: a turn table (13) for rotating an information record disc, which is placed on the turn table; a clamper (15) for holding the information record disc between the clamper and the turn table; a chassis (10) on which at least one of the clamper and the turn table is mounted and which has a rotation shaft (11a, 11b) parallel to a main surface of the information record disc held between the clamper and the turn table; a driving device (8a, 12) for transmitting a driving force to the chassis so as to rotate the chassis with the rotation shaft at a rotation axis; and an optical pickup (20) for at least reading a signal from the information record disc held between the clamper and the turn table while the disc is rotated on the turn table, wherein a gap (W) is prepared between the rotation shaft and a bearing (22b) for the rotation shaft in a direction parallel to the main surface such that the rotation shaft has a play in the direction parallel to the main surface.

According to the disc player of the present invention, since the rotation shaft has a play i.e., a margin in which the rotation shaft can move, in the direction parallel to the main surface, the rotation shaft escapes in the direction parallel to the main surface within this margin, so as to absorb the stiffness in the rotation movement when the chassis is rotation-driven. Therefore, even if the position of the chassis on the main surface is restricted at a position other than the rotation shaft, it is possible to smoothly rotate the chassis.

In one aspect of the disc player of the present invention, the rotation shaft (11a, 11b) is disposed on one end of the chassis (10), and the disc player is further provided with a guide member (30), which is disposed on the other end of the chassis, for guiding a rotation movement of the chassis around the rotation shaft.

According to this aspect, since the guide member for guiding the rotation movement is provided on the other end of the chassis, it is possible to prevent a miss clamp of the disc at the clamper and the turn table since the positional accuracy of the chassis in the direction parallel to the main surface can be certainly improved. Further, since the rotation shaft has a play in the direction parallel to the main surface, the rotation shaft escapes in the direction parallel to the main surface, so as to absorb the stiffness in the rotation movement when the chassis is rotation-driven. Therefore, even if the rotation movement of the chassis is redundantly restricted by the rotation shaft and the guide member, it is still possible to smoothly rotate the chassis.

In another aspect of the disc player of the present invention, the rotation shaft (11a, 11b) is disposed on each side of the chassis (10), and the gap (W) is prepared on only one side of the chassis.

According to this aspect, since the gap is prepared on one side of the chassis between one rotation shaft (11b) and one bearing (22b) while the gap is not prepared on another side of the chassis between another rotation shaft (11a) and another bearing (22a), the rotation movement of the chassis can be smoothly and stably performed.

In another aspect of the disc player of the present invention, the rotation shaft (11b) is formed by shaving off both sides of a rounded shaft member so that the gap (W) is prepared in correspondence with shaved off portions of the rotation shaft member as the rotation shaft.

According to this aspect, it is relatively easy to prepare the gap between the rotation shaft and the bearing.

Alternatively, in another aspect of the disc player of the present invention, the bearing (41) has an inner size wider than a diameter of the rotation shaft (40) so that the gap is prepared in correspondence with a difference between the inner size and the diameter.

In another aspect of the disc player of the present invention, the disc player is further provided with a loading tray (1) for loading the information record disc, and the bearing (22a, 22b) is formed on the loading tray.

According to this aspect, the information record disc can be certainly loaded to the disc player by the action of the loading tray.

In this aspect, the disc player may be further provided with a rotational tray (3), which is rotatably disposed on the loading tray (1) and which has a plurality of disc accommodation rooms (3b) each accommodating one information record medium.

In another aspect of the disc player of the present invention, the optical pickup (20) is mounted on the chassis (10) movably in a radial direction of the information record disc held between the clamper (15) and the turn table(13).

According to this aspect, the reproduction operation and/or recording operation can be accurately performed while the optical pickup is moved on the chassis, which is smoothly rotated.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

Figure 1:
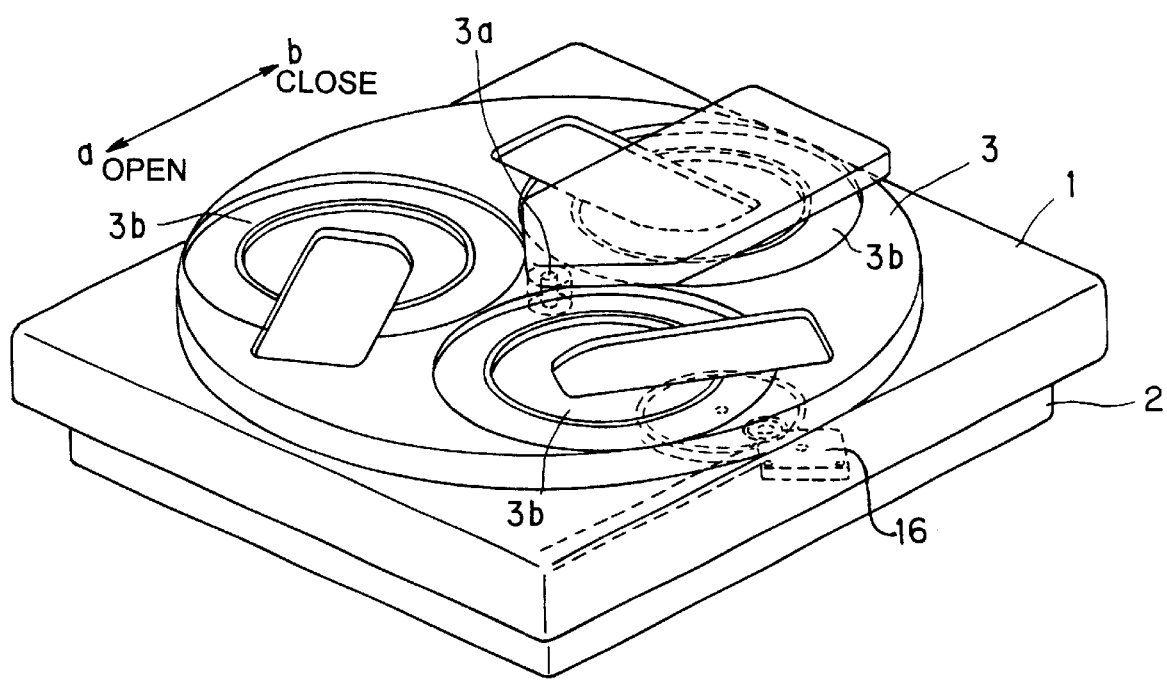
FIG. 1 is a perspective view of a disc player as an embodiment of the present invention.
Figure 2:
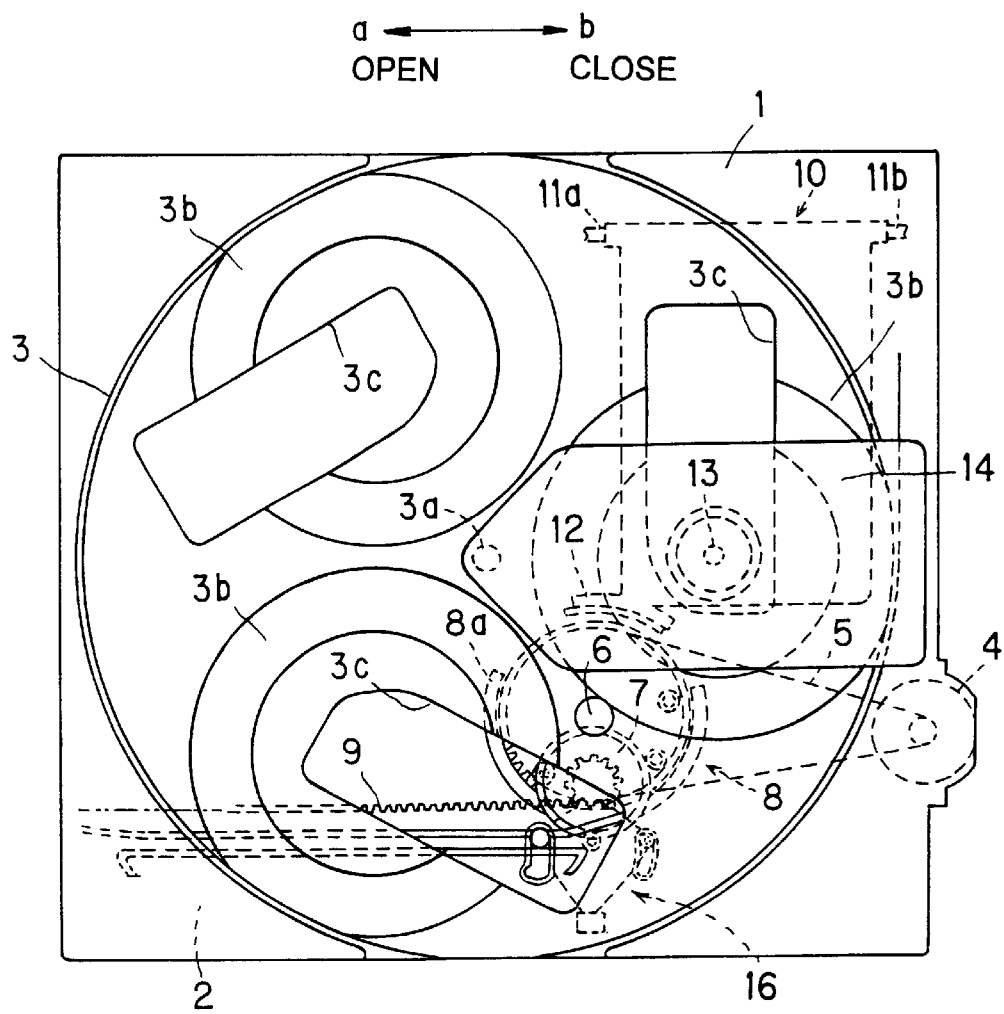
FIG. 2 is a plan view of FIG. 1.
Figure 3:
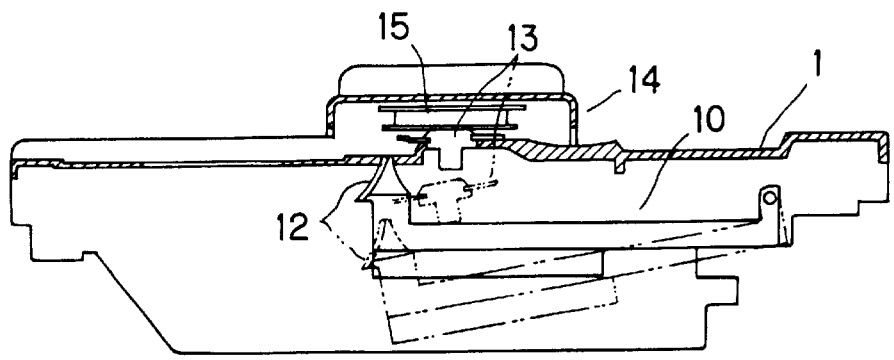
FIG. 3 is a sectional view of a chassis equipped in the disc player of FIG. 1.

FIG. 1 to FIG. 3 shows a disc player as an embodiment of the present invention.

As shown in FIG. 1, a loading tray 1 in a rectangular shape is held movably in directions of an arrow a (i.e., an open direction) and an arrow b (i.e., a close direction), with respect to a base 2. On the loading tray 1, a rotational tray 3 in a disc shape is held rotatably with a shaft 3a as a fulcrum thereof. On the rotational tray 3, three disc accommodating rooms 3b are prepared.

FIG. 2 shows a plan view of the above mentioned disc player. In the loading tray 1, a driving motor 4 is equipped, so that the driving motor 4 rotates the rotational tray 3 and moves the loading tray 1 in the directions of the arrows a and b.

At first, a driving mechanism of the rotational tray 3 is explained roughly. The driving force from the driving motor 4 is transmitted to a gear pulley 6, which is held rotatably on the loading tray 1, through a belt 5. The gear pulley 6 rotates an epicyclic gear 7 by engaging the epicyclic gear 7. By rotation of the epicyclic gear 7, a main cam 8 is rotated. The rotation of the main cam 8 is transmitted to the rotational tray 3 through a Geneva mechanism.

Next, a moving mechanism of the loading tray 1 is explained roughly. The epicyclic gear 7 is engaged with a rack 9, which is fixed on the base 2 when it is in a position shown in FIG. 2. In a condition that the epicyclic gear 7 is engaged with the rack 9, the epicyclic gear 7 is rotated by the driving force from the driving motor 4. The epicyclic gear 7 moves in the directions of the arrows a and b with respect to the rack 9. The loading tray 1 fixed on the side of the epicyclic gear 7 also moves in the directions of the arrows a and b with respect to the base 2.

The rotation of the rotational tray 3 and the movement of the loading tray 1 are switched over by a switching device 16, so that the driving force from the driving motor 4 is transmitted to either one of the rotational tray 3 and the loading tray 1. Namely, when rotating the rotational tray 3, the movement of the loading tray 1 is restricted by the switching device 16, so that the driving force from the driving motor 4 is only transmitted to the rotational tray 3 through the epicyclic gear 7. On the other hand, when loading the disc, the rotation of the main cam 8 is restricted by the switching device 16, so that the driving force from the driving motor 4 is only transmitted o the base 2 through the epicyclic gear 7.

As shown in FIG. 2 and FIG. 3, a chassis 10 is rotatably fixed on the loading tray 1. The chassis 10 has a pair of rotation shafts 11a and 11b, which are parallel to the main surface of the disc. The pair of rotation shafts 11a and 11b are rotatably held by bearings provided in the loading tray 1, so that the chassis 10 is rotated with the rotation shafts 11a and 11b as a rotation center thereof.

When clamping the disc, the chassis is pressure-applied by an elastic member not shown in the upper direction. A turn table 13 fixed on the spindle shaft of the spindle motor through a float rubber etc., and an optical pickup for reading the information of the disc are equipped on the chassis 10. Along with the rotation of the chassis 10 in the upper direction, the turn table 13 is swung in the upper direction, and is transferred through an aperture portion 3c, which is formed in the disc accommodation room 3b. Above the turn table 13, the clamper 15 is waiting for the swinging movement in the upper direction of the turn table 13. The disc is clamped between the clamper 15 and the turn table 13. The clamper 15 is held by a clamper holder 14, which is fixed on the loading tray 1.

As shown in FIG. 3, a cam protrusion 12 in a mountain shape is formed at a corner of the chassis 10. As shown in FIG. 2, by the rotation of the main cam 8, a tip portion of the main cam 8 abuts to the cam protrusion 12, and the cam protrusion 12 is gradually displaced in the lower direction against the applied pressure of the elastic member. Thus, the chassis 10 is rotated in the lower direction with the rotation shafts 11a and 11b as the rotation center thereof. This movement is performed when releasing the clamp of the disc or when rotating the rotational tray 3.

Figure 4:
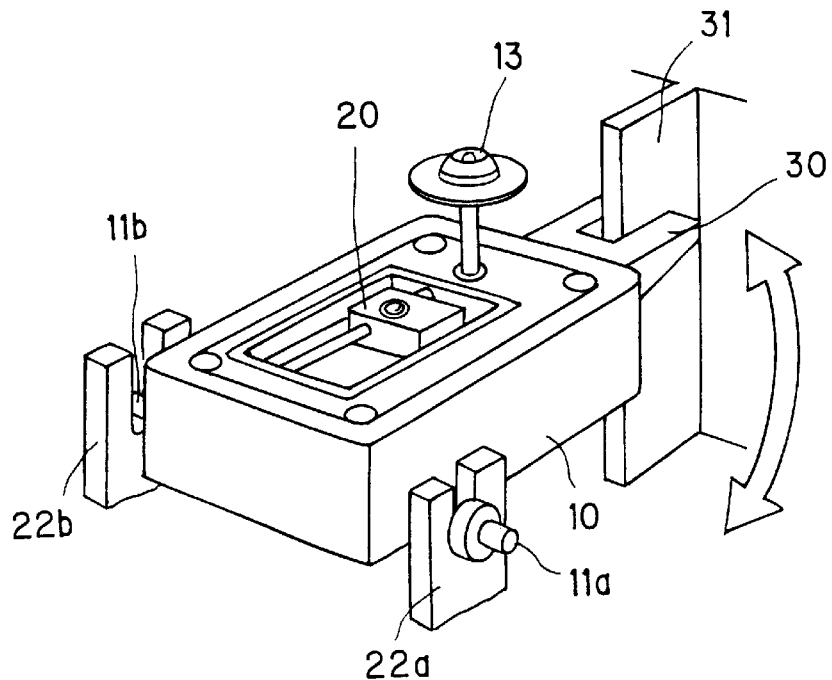
FIG. 4 is a schematic perspective view showing the chassis of the embodiment.
Figure 5:
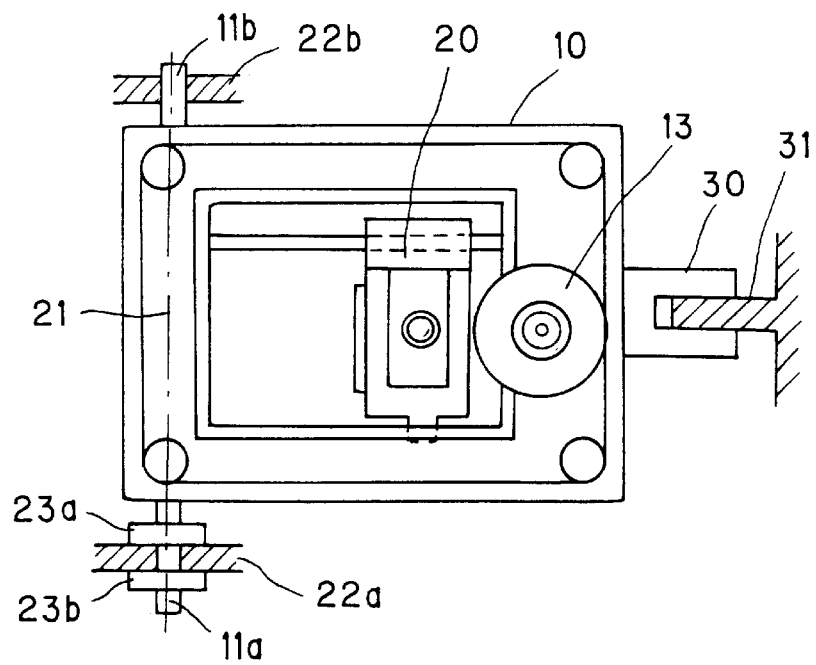
FIG. 5 is a plan view of FIG. 4.

FIG. 4 and FIG. 5 shows the chassis 10, on which the turn table 13 and an optical pickup 20 are mounted. As described above, the chassis 10 has the rotation shafts 11a and 11b which are parallel to the main surface of the disc, and is rotated with the rotation shafts 11a and 11b as the rotation central axis thereof by the elastic member and the cam. The rotation shafts 11a and 11b have a common central line 21. The rotation shafts 11a and 11b are held rotatably by bearings 22a and 22b, which are respectively provided on the loading tray 1.

Here, the rotation shaft 11a is held in such a condition that a gap is not prepared between the rotation shaft 11a and the bearing 22a. On the rotation shaft 11a, swelling portions 23a and 23b are formed so as to sandwich the bearing 22a. Thus, the movement of the rotation shaft 11a in the direction of thrust is prevented. Namely, the position of the rotation shaft 11a is fixed by the bearing 22a and the swelling portions 23a and 23b.

Figure 6:
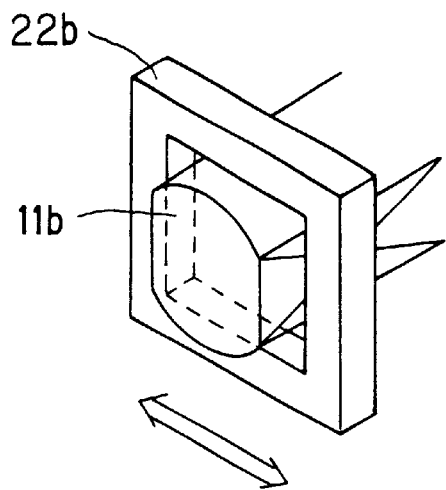
FIG. 6 is a perspective view showing a rotation shaft and a bearing of the embodiment.

The rotation shaft 11b is held rotatably by the bearing 22b. As shown in FIG. 6, the rotation shaft 11b is formed such that both sides thereof are shaved off, which is different from the rotation shaft 11a i.e., which is not a rounded shaft. Hence, a gap is prepared between the rotation shaft 11b and the bearing 22b in the direction of the main surface of the disc, so that a margin in which the rotation shaft 11b can move in the direction of the main surface of the disc (in the directions of the arrows) i.e., it has a play.

Figure 7A:
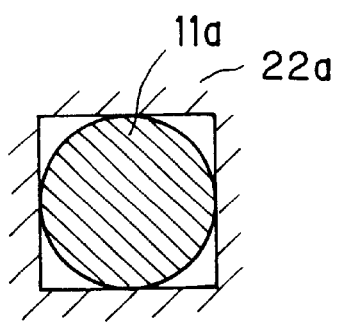
FIG. 7A is a sectional view of the rotation shaft and the bearing, in a condition that a gap is not prepared therebetween, of the embodiment.
Figure 7B:
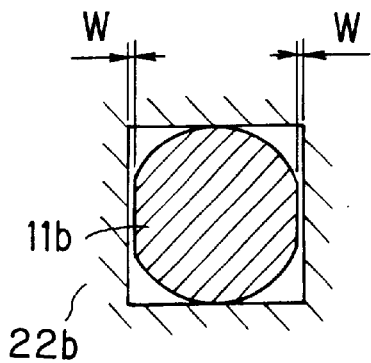
FIG. 7B is a sectional view of the rotation shaft and the bearing, in a condition that a gap is prepared therebetween, of the embodiment.

FIG. 7A shows a sectional view of the rotation shaft 11a and the bearing 22a while FIG. 7B shows a sectional view of the rotation shaft 11b and the bearing 22b. Since no gap is prepared between the rotation shaft 11a and the bearing 22a in the vertical direction as well as in the horizontal direction, the position of the rotation shaft 11a is fixed in the vertical direction as well as the horizontal direction. On the contrary to this, a small gap W is prepared between the rotation shaft 11b and the bearing 22b in the direction of the main surface of the disc, so that the rotation shaft 11b has the margin in movement within the gap W.

As shown in FIG. 4 and FIG. 5, on the other side of the chassis 10 where the rotation shafts 11a and 11b are attached, a guide member 30 is attached, in which a groove is formed. A guide rail 31, which extends in a direction perpendicular to the direction of the main surface of the disc, is inserted in the groove of the guide member 30. Therefore, the chassis 10 is rotated with the rotation shafts 11a and 11b as the center thereof, while the rotation movement is guided by the guide member 30. In this manner, by virtue of the guide member 30, the positional accuracy of the chassis 10 in the direction of the main surface of the disc is improved, so that it is possible to prevent a miss-clamp of the disc at the clamper 15 and the turn table 13.

According to the disc player of the present embodiment, even if the position of the chassis 10 in the direction of the main surface of the disc is further restricted by the guide member 30 in this manner, since the margin or play is prepared for the rotation shaft 11b in the direction of the main surface, it is possible to absorb the stiffness of the rotation movement as the rotation shaft 11b escapes in the direction of the main surface when rotation-driving the chassis 10. Thus, it is possible to release the chassis 10 from the redundant restriction, and it is possible to smoothly rotate the chassis 10.

Figure 8:
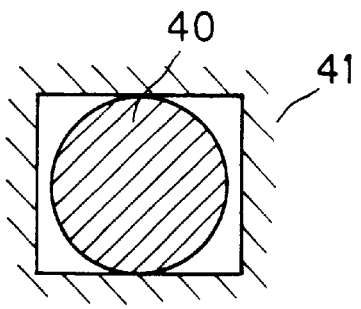
FIG. 8 is a sectional view showing another embodiment of the rotation shaft and the bearing.

FIG. 8 shows another example of a rotation shaft 40 and a bearing 41. As shown in FIG. 8, even if both sides of the rotation shaft 40 are not shaved off, since the inner size of the bearing 41 in the direction of the main surface of the disc is set larger than the diameter of the rotation shaft 40, a gap may be prepared between the rotation shaft 40 and the bearing 41.

Figure 9A:
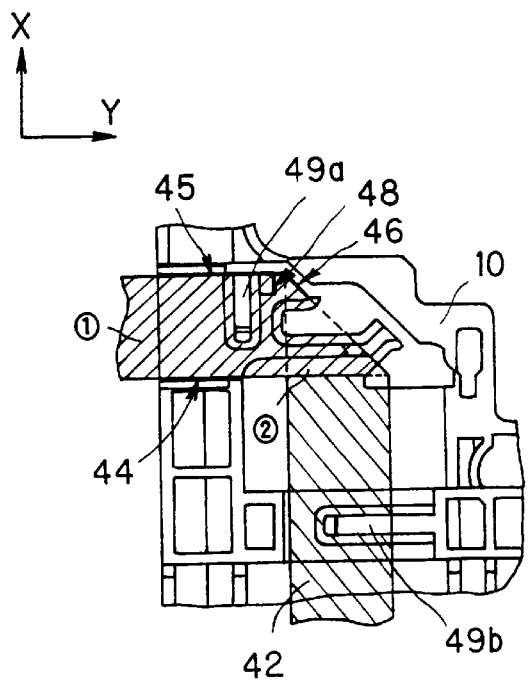
FIG. 9A is a bottom view of a wide flexible connector fixed on the chassis.
Figure 9B:
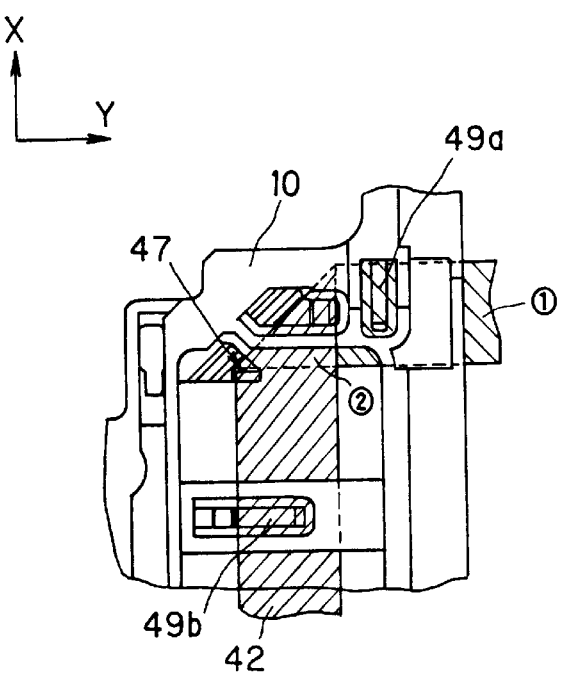
FIG. 9B is a plan view of the wide flexible connector fixed on the chassis.
Figure 10A:
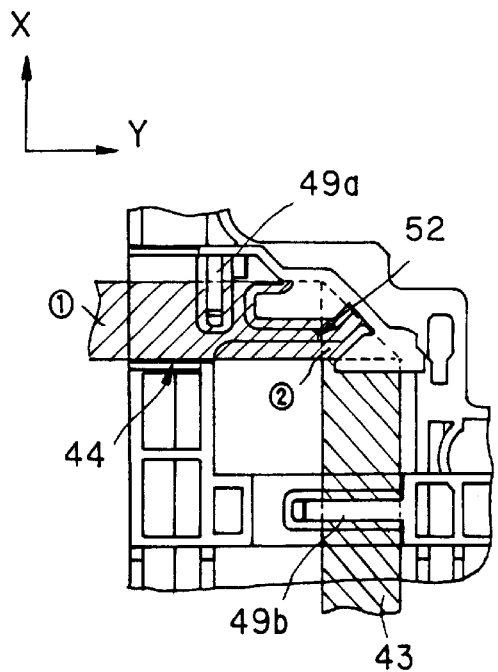
FIG. 10A is a bottom view of a narrow flexible connector fixed on the chassis.
Figure 10B:
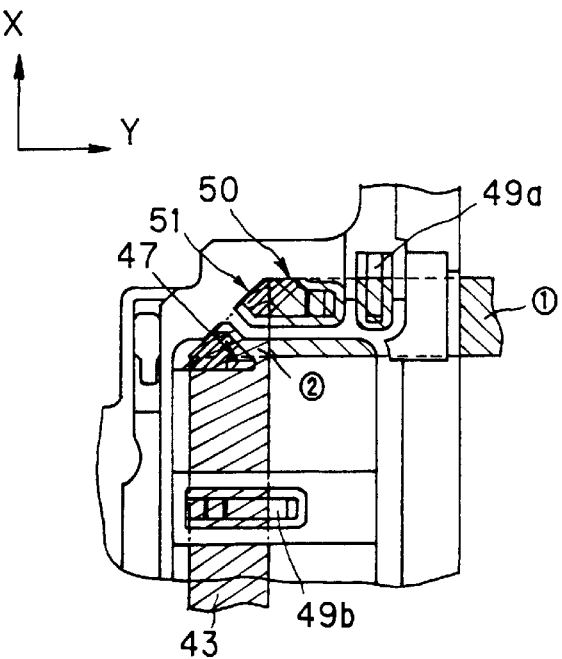
FIG. 10B is a plan view of the narrow flexible connector fixed on the chassis.

FIG. 9A is a bottom view of a wide flexible connector 42 fixed on the chassis 10, and FIG. 9B is a plan view of the wide flexible connector 42. FIG. 10A is a bottom view of a narrow flexible connector 43 fixed on the chassis 10, and FIG. 10B is a plan view of the narrow flexible connector 43. In those figures, the flexible connectors 42 and 43 are respectively shown by hatching lines, and only hidden outlines of the flexible connectors 42 and 43 are indicated by broken lines.

As shown in FIG. 9A and FIG. 9B, the wide flexible connector 42 shaped in a band is bent by 90 degrees and is fixed on the chassis 10. A common positioning wall member 44, a positioning wall member 45 for the wide flexible connector 42, and a corner positioning wall member 46 for the wide flexible connector 42 are formed on the chassis 10. As both sides of a straight portion ① of the wide flexible connector 42 extending in the Y direction abuts to the common positioning wall member 44 and the positioning wall member 45, the wide flexible connector 42 is positioned as for the X direction. As a bent portion ② of the wide flexible connector 42 abuts to the corner positioning wall member 46, the wide flexible connector 42 is positioned as for the Y direction. In this manner, by positioning the wide flexible connector 42 as for the X direction as well as the Y direction, the plane position of the wide flexible connector 42 is determined on the chassis 10. On the other hand, a protrusion 47 for preventing a common disengagement and a protrusion 48 for preventing a disengagement for the wide flexible connector 42 are formed on the chassis 10. As the protrusion 47 for preventing the common disengagement is engaged with one end of the straight portion ① of the wide flexible connector 42, the disengagement in the X direction of the straight portion ① of the wide flexible connector 42 is prevented. On the other hand, as the protrusion 48 for preventing the disengagement is engaged with one end of the bent portion ② of the wide flexible connector 42, the disengagement in the Y direction of the bent portion ② of the wide flexible connector 42 is prevented. Therefore, the disengagement of the wide flexible connector 42 on the whole is prevented as for the X direction as well as the Y direction. Moreover, the wide flexible connector 42 is sandwiched between a pair of sandwiching members 49a and 49b in a perpendicular direction.

As shown in FIG. 10A and FIG. 10B, the narrow flexible connector 43 shaped in a band is bent by 90 degrees and is fixed on the chassis 10. A wall member 50 for the narrow flexible connector 43, and a corner positioning wall member 51 for the narrow flexible connector 43 are formed on the chassis 10. As both sides of a straight portion ① of the narrow flexible connector 42 extending in the Y direction abuts to the common positioning wall member 44 and the positioning wall member 50, the wide flexible connector 42 is positioned as for the X direction. As a bent portion ② of the narrow flexible connector 43 abuts to the corner positioning wall member 51, the narrow flexible connector 43 is positioned as for the Y direction. In this manner, by positioning the narrow flexible connector 43 as for the X direction as well as the Y direction, the plane position of the narrow flexible connector 43 is determined on the chassis 10. On the other hand, a protrusion 52 for preventing a disengagement for the narrow flexible connector 43 is formed on the chassis 10. As the protrusion 47 for preventing the common disengagement is engaged with one end of the straight portion ① of the narrow flexible connector 43, the disengagement in the X direction of the straight portion ① of the narrow flexible connector 43 is prevented. On the other hand, as the protrusion 52 for preventing the disengagement is engaged with one end of the bent portion ② of the narrow flexible connector 43, the disengagement in the Y direction of the bent portion ② of the narrow flexible connector 43 is prevented. Therefore, the disengagement of the narrow flexible connector 43 on the whole is prevented as for the X direction as well as the Y direction. Moreover, the narrow flexible connector 43 is sandwiched between a pair of sandwiching members 49a and 49b in a perpendicular direction.

In case of an optical pickup, a spindle etc., for the DVD, the number of transmissions and receptions of signals is increased as compared with that for the CD. Therefore, the width of the flexible connector for the DVD is wider than that for the CD. Thus, if the flexible connector fixing portion for the CD is formed on the chassis 10, it becomes necessary to change the design of the flexible connector fixing portion in line with the flexible connector for the DVD. However, by forming the positioning wall members 44, 45, 46, 50 and 51 and the protrusions 47, 48 and 52 for preventing the disengagement on the chassis 10 so as to fix any one of the narrow flexible connector 43 for the CD and the wide flexible connector 42 for the DVD on the chassis 10, it is possible to deal with both wide and narrow flexible connectors 42 and 43 without changing the design of the chassis 10.

In the above described embodiment, the rotation shafts 11a and 11b, which have the common central line 21 (refer to FIGS. 4 and 5), may be integrally formed with the chassis 10 from a resin material etc., or may be formed separately from the chassis 10 and then attached to the chassis 10. Alternatively, the rotation shafts 11a and 11b may be integrally formed of one bar penetrating through the chassis 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-269555 filed on Sep. 24, 1998 including the specification, claims, drawings and summary is incorporated herein by reference in its entirety.

What is claimed is:

1. A disc player comprising:

a turn table for rotating an information record disc, which is placed on the turn table;

a clamper for holding the information record disc between the clamper and the turn table;

a chassis on which at least one of the clamper and the turn table is mounted and which has a rotation shaft parallel to a main surface of the information record disc held between the clamper and the turn table;

a driving device for transmitting a driving force to the chassis so as to rotate the chassis with the rotation shaft at a rotation axis; and an optical pickup for at least reading a signal from the information record disc held between the clamper and the turn table while the disc is rotated on the turn table, wherein a gap is prepared between the rotation shaft and a bearing for the rotation shaft in a direction parallel to the main surface such that the rotation shaft has a play in the direction parallel to the main surface, and the play in the direction parallel to the main surface is larger than a play in a direction perpendicular to the main surface in a state the information record disc is held between the clamper and the turn table.

2. A disc player according to claim 1, wherein the rotation shaft is disposed on one end of the chassis, and the disc player further comprises a guide member, which is disposed on the other end of the chassis, for guiding a rotation movement of the chassis around the rotation shaft.

3. A disc player according to claim 1, wherein the rotation shaft is disposed on each side of the chassis, and the gap is prepared on only one side of the chassis.

4. A disc player according to claim 1, wherein the rotation shaft is formed by shaving off both sides of a rounded shaft member so that the gap is prepared in correspondence with shaved off portions of the rotation shaft member as the rotation shaft.

5. A disc player according to claim 1, wherein the bearing has an inner size wider than a diameter of the rotation shaft so that the gap is prepared in correspondence with a difference between the inner size and the diameter.

6. A disc player according to claim 1, wherein the disc player further comprises a loading tray for loading the information record disc, and the bearing is formed on the loading tray.

7. A disc player according to claim 6 further comprises a rotational tray, which is rotatably disposed on the loading tray and which has a plurality of disc accommodation rooms each accommodating one information record medium.

8. A disc player according to claim 1, wherein the optical pickup is mounted on the chassis movably in a radial direction of the information record disc held between the clamper and the turn table.

* * * * *